Nov. 9, 1954     E. HORLBECK     2,693,597
HEAD MASK FOR ELECTRIC ARC WELDING
Filed Aug. 11, 1952     2 Sheets-Sheet 1
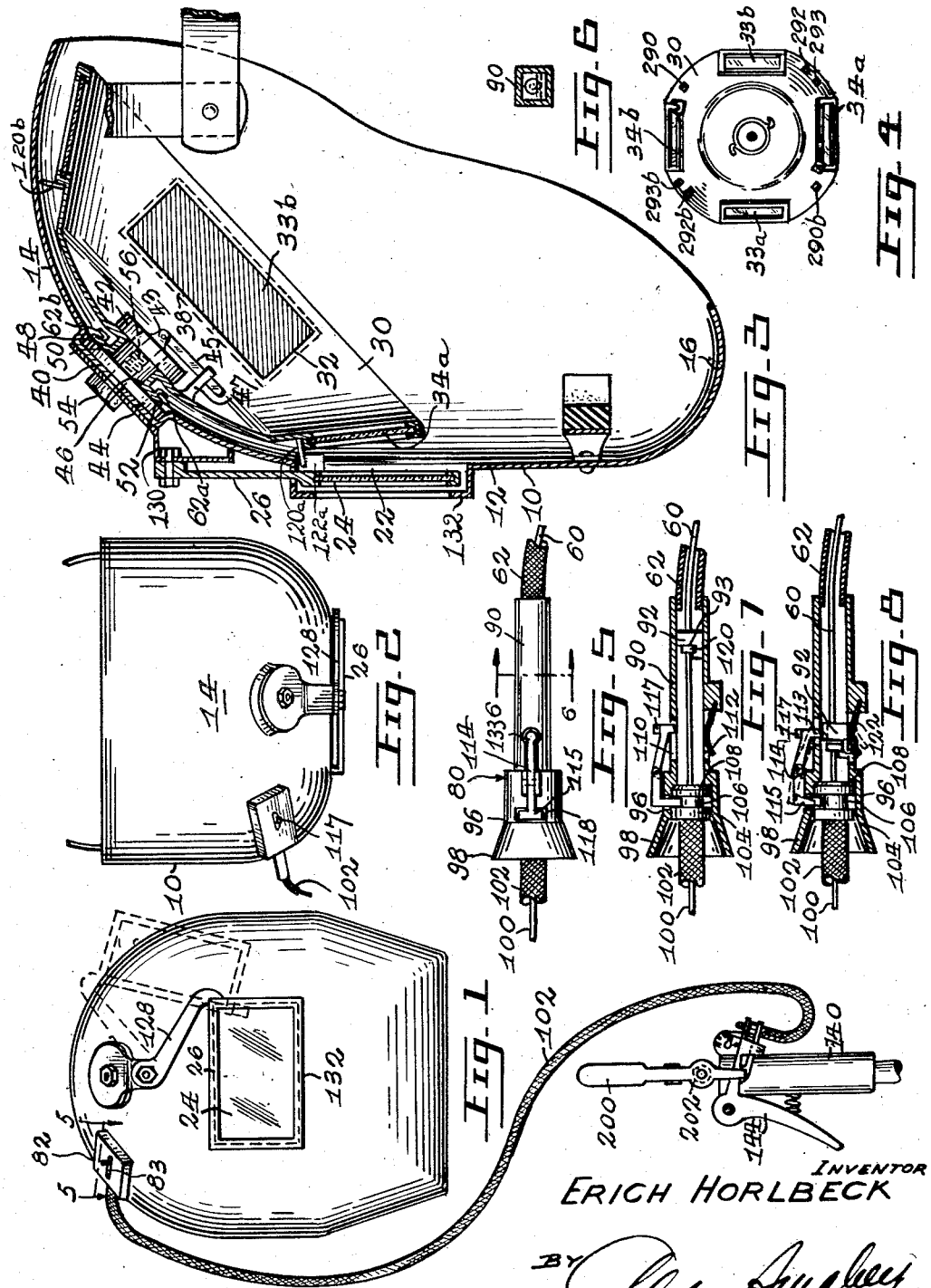
INVENTOR
ERICH HORLBECK
ATTORNEY Nov. 9, 1954  E. HORLBECK  2,693,597
HEAD MASK FOR ELECTRIC ARC WELDING
Filed Aug. 11, 1952  2 Sheets-Sheet 2
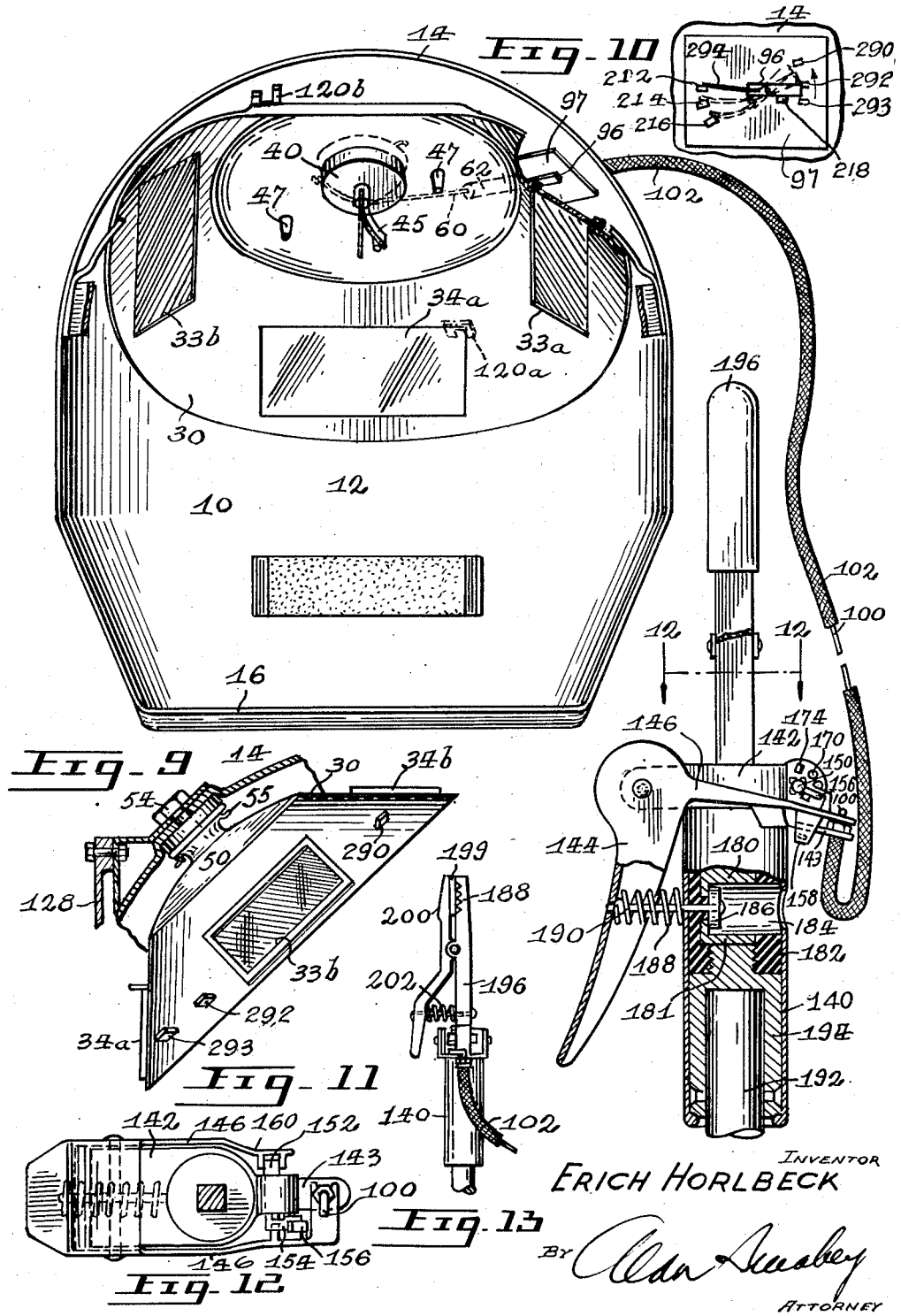
INVENTOR
ERICH HORLBECK
BY
ATTORNEY

United States Patent Office 2,693,597
Patented Nov. 9, 1954

2,693,597

HEAD MASK FOR ELECTRIC ARC WELDING

Erich Horlbeck, Montreal, Quebec, Canada

Application August 11, 1952, Serial No. 303,699

8 Claims. (Cl. 2—8)

The present invention relates to welding helmets, and, more particularly, to welding helmets embodying means whereby the protective viewing glass may be interchanged.

In present day electrical welding it is often necessary for a welder to switch from the use of a large electrode to a small electrode and vice versa to suit the particular work he is doing. If the helmet he is wearing is provided with a protective anti-glare glass suitable for welding with a large electrode and he has to switch to a small electrode, he cannot see the arc with sufficient clarity to perform accurate work. On the other hand, if he is using a helmet having a protective glass suitable for welding with a small electrode and he has to switch to a large electrode, the arc is too bright. Consequently, either the entire helmet or the protective glass mounted within the helmet must be changed to suit each condition.

It will be appreciated that this procedure is inconvenient and involves work stoppage and loss of welding time on the part of the operator. This is particularly so when the welder is a one armed person or otherwise handicapped, so as to have the complete use of only one arm.

The present invention recognizes this problem and aims to furnish a satisfactory solution by providing a welding helmet construction that embodies means whereby the protective anti-glare glasses may be easily and automatically changed by a manual control preferably mounted on the electrode holder.

Accordingly, the invention is embodied in a welder's mask having a viewing opening therethrough and comprises means mounted within the mask for supporting a plurality of glare-proof vision masking elements and control means associated with said supporting means whereby the elements can be moved in selective register with the mask viewing opening.

More specifically, in a preferred construction, a supporting frame is mounted for rotation on the mask behind the viewing opening and the glare-proof vision masking elements are mounted on the frame in radially spaced apart relationship. Each of the elements are of a size and so disposed so as to overlap the viewing opening of the mask in selective sequence upon rotation of the frame. A drive means comprising of a pulley is mounted centrally of the supporting frame and a flexible cable is partially wrapped about the pulley so that tension on the cable tends to rotate the pulley. A resilient spring is connected between the supporting frame and mask so as to urge the frame in a direction opposed to the cable controlled rotation and registering stop means are provided between the frame and mask whereby the frame is stopped after partial rotation to place the desired masking element in register. The flexible cable extends from the mask where it is sheathed in a flexible tube which extends to and is retained by a bracket attachable to the electrode holder. The exterior end of the cable extends beyond the flexible sheath to a connection with a suitable manual control lever also mounted on the electrode.

With this arrangement when it is necessary to change the glare-proof vision masking elements, actuation of the manual control lever causes rotation of the supporting frame to remove one element from register with the viewing opening and bring another element of the desired quality into register.

When required, further manipulation of the control lever releases a locking arrangement so that the supporting frame is free to counter-rotate under the influence of the resilient spring so as to return the first element to its original position.

Means are also provided whereby an exterior shielding glass visor is moved into and out of alignment with the viewing opening.

Having thus generally described the nature of the invention particular reference will be made to the accompanying drawings, and in which:

Figure 1 is a view in front elevation of a welding mask construction embodying the invention and including an electrode holder and associated actuating mechanism.

Figure 2 is a top plan view of the construction shown in Figure 1.

Figure 3 is a vertical cross sectional view of the construction shown in Figure 1 to illustrate the construction and mounting of the inner frame in more detail.

Figure 4 is a top plan view of the interior of the mask construction showing the inner rotatable frame and the selective stop mechanism.

Figure 5 is an enlarged detail view of the lead-in attachment construction for the actuating cable which is positioned within the mask substantially along the line 5—5 of Figure 1.

Figure 6 is a cross sectional view of Figure 5 along the line 6—6.

Figure 7 is a cross sectional view of the construction shown in Figure 5 showing the actuating cable in fully extended position or starting position.

Figure 8 is a cross sectional view corresponding to Figure 7 showing the actuating cable in retracted or terminal position.

Figure 9 is a rear view partially in section of the mask construction shown in Figure 1 with the electrode holder and actuating mechanism shown in enlarged detail.

Figure 10 is a fragmentary view showing diagrammatically the spring and stop arrangement co-operating with the rotatable inner frame.

Figure 11 is a view in side elevation of the rotatable inner frame with a portion of the mask shown in section to illustrate the mounting in more detail.

Figure 12 is a plan view of the electrode holder and cable-actuating mechanism as seen along the line 12—12 of Figure 9.

Figure 13 is a side view of the electrode holder and cable actuating mechanism rotated 90° from the position shown in Figure 9 to show the electrode gripping jaws in more detail.

With particular reference to Figures 1, 2 and 3 of the drawings, a preferred construction of a welder's helmet embodying the invention consists of a fireproof plastic or sheet metal hood 10 which is preferably made up of a one-piece blank of sheet metal or fibre or the like formed to the required shape. Alternatively, the hood can be molded from fibreglass or other similar material. The hood 10 includes a front panel 12 which has an upper semi-circular portion 14 which is adapted to extend above the head of the welder and a lower protective skirt 16 which extends rearwardly of the front panel 12.

The front panel 12 includes a framed viewing opening 22 which is normally masked by a transparent window 24 mounted in a movable supporting frame 26, as will be described in more detail later. In accordance with the invention, an element supporting frame assembly is mounted on the hood front panel portion 14 for rotation behind the viewing opening 22. The supporting frame assembly consists of a dish-shaped main supporting frame 30 which is provided with radially spaced apart openings 32 each of which is adapted to receive one of a plurality of glare masking elements 33, 34. In the construction shown, the elements 33 are of clear or faintly tinted glass and the elements 34 are of varying degrees of tinted glass suitable for welding purposes, the element 34a being suitable for a light arc, the element 34b being suitable for a heavier arc.

The elements 33, 34 are retained in position in the supporting frame openings 32 by means of supporting frames 38 into which the elements slidably fit.

The inner element supporting frame 30 is mounted for rotation within the hood on a cylindrical spindle 40 which includes a fixed inner boss 42 and a removable outer boss 44 which are maintained in predetermined spaced apart relationship by a shoulder 46 in the spindle 40 on which the boss 42 bears. The frame 30 includes a central opening 48 which is surrounded by an inwardly extending cylindrical extension 50 having an outwardly extending marginal flange 52. On assembly, the spindle 40 is fitted through the opening 48, the boss 44 fitted over the spindle 40 and by means of a bolt 54 extending through the hood portion 14 to a threaded engagement with a tapped opening 56 provided in the spindle 40, the inner element supporting frame is secured in position.

The spacing between the bosses 42, 44, the height of the extension 50, the inside diameter of the opening 48 and the outside diameter of the spindle 40 are such that the inner frame 30 is free to rotate about the fixed spindle 40. The cylindrical extension 50, due to the flange 52 also serves as an annular pulley adapted to receive an actuating cable 60 as will be described in more detail.

The inner supporting frame 30 is thus free to rotate so that the masking elements 33, 34 can be selectively moved into register with the viewing opening 22. The rotational movement is imparted to the inner frame 30 by means of the push-pull Bowden cable 60, the inner end of which is engaged with one of a pair of hooks 62a, 62b, provided on the flanged extension 50. The cable 60 passes about the extension 50 so that a pull on the cable causes the entire inner assembly to rotate in one direction. The cable 60 extends from the extension 50 to a connection with a lead-in attachment 80 mounted within a housing 82 secured to the welding hood.

With particular reference to Figures 5, 6, 7 and 8 the lead-in attachment consists of a tubular member 90 of square cross section to one end of which there is attached a length of flexible tubing 62 wherein the cable 60 slidably fits. A connecting member 92 is slidably fitted within the member 90 and is connected to the end of the cable 60. The other end of the tubular member 90 is provided with an enlarged section 96 terminating in an outwardly flared cone 98 which serves as a guiding member for the connection of the outside cable portion 100. The cable portion 100 is housed within the usual flexible tubing sheath 102 with the end of the sheath 102 being connected to a cylindrical end fitting 104 having an inwardly extending retaining groove 106 and a tapered leading end 108.

The member 90 is provided with opposed slots 110, 112, the slot 112 being of sufficient dimensions to allow the member 92 to be depressed outwardly of the member 90 by one end 113 of a double ended lever arm 114. The lever arm 114 is pivotally mounted on the exterior of the member 90 so that the end 113 can be depressed through the slot 110. The other end 115 of the member 114 slidably fits through a further opening 118 provided in the member 90 so as to come into locking contact with the recess 106 in the cable end fitting 104.

The end of the cable portion 100 extending beyond the end fitting 104 is provided with an end member 120 which is adapted to be interlocked with the connecting member 92. The member 92 is provided with a recess 93 adapted to accommodate the cable end member 120. A resilient spring 122 is mounted on the member 90 so as to extend across the slot 112 so as to resiliently return the member 92 into axial alignment with the interior of the member after depression.

With this arrangement, when it is desired to disconnect the cable portion 100 from the cable portion 60, the cable 60 is moved to the position shown in Figure 8. Depression of the lever arm 114 causes the lever end 113 to depress the member 92 through the slot 112 while the other end of the lever 114 is raised from engagement with the end fitting 104. Accordingly, the flexible tubing 102, end fitting 104 and cable portion 100 can be withdrawn from the member 90. To re-connect the outside cable the end portion 104 is pushed into the cone 98 of the member 90 so that the tapered leading end 108 contacts and raises the lever end 115. The raising of the lever end 115 depresses the end 113 so that the recess 93 of the member 92 is again in position to receive the end fitting 120 of the cable 100. As the lever end 115 passes into the annular recess 106 of the end fitting, the upward movement of the lever end 113 again brings the member 92 into axial alignment within the member 90 under the influence of the spring 122. When this arrangement is mounted within the housing 82, an extension 117 of the lever end 113 protrudes through a slot 83 so that the releasing lever can be easily manipulated by the operator.

As previously mentioned, the elements 33, 34a, 34b, are mounted in equally radially spaced apart relationship on the supporting member 30 so that they may be selectively moved into register with the viewing opening 22 by the action of the cable portion 60. In the construction illustrated, the first tinted or glare masking element 34a is in masking position so that the initial rotation of the frame 30 moves this element away and brings the clear element 33a into alignment with the viewing window 22. As will be appreciated, if it is desired to bring the second and darker element 34b into operative position, it is necessary that the cable end 60 be disengaged from the hook 62a, the frame rotated by hand and the cable re-engaged on the hook 62b.

In order that the frame 30 be stopped as required, to bring the various elements into register with the viewing window 22, there are provided outstanding bosses 290, 292, 293, mounted on and extending from the outer surface of the frame 30 in staggered relationship adjacent the peripheral edge. These bosses co-operate with a flexible stop member 294 pivotally mounted on the interior of the hood portion 14. First, it must be mentioned that the boss 42 of the spindle 40 is provided with an extension 43 on which there is mounted a resilient flat spring 45 which is adapted to contact outstanding pins 47 mounted in radially spaced apart relationship on the inner surface of the supporting frame 30. Accordingly, as the frame 30 is rotated by pressure of the cable 60, about the spindle 40, the spring 45 acts to rotate the frame 30 in the opposite direction.

The flexible stop member 294 is mounted on, and extends outwardly from, a bar 96 which is pivotally mounted on a plate 97. The plate 97 is in turn secured to the interior of the hood portion 14 so that the outer end of the bar 96 is disposed in the path of the bosses 290, 292, 293. Three stop bosses 212, 214 and 216 are mounted on the plate 97 in radially spaced apart relationship so as to be in the path of the end of the flexible member 294 and a stop member 218 is secured to the plate 97 so as to be in a position to restrain the pivotal movement of the bar 96 in one direction.

The bosses 290, 292, 293 are positioned with respect to the outer periphery of the supporting frame 30 so that when the cable is attached to the hook 62a, as shown, the tinted element 34a is in alignment with the viewing opening 22 and the boss 290 is positioned beyond the bar 96. Under the influence of the spring 45 the frame 30 is urged in a direction opposed to the cable direction so that the boss 290 bears against the bar 96. As the bar 96 is stopped from pivotal movement by the stop member 218, the frame 30 is retained in this position.

When it is desired to remove the element 34a and bring the clear element 33a into alignment with the viewing opening, a pull of the cable portion 60 rotates the frame 30 and brings the boss 292 into contact with the bar 96 so that the flexible member 294 is bending against the stop boss 102. The continued rotation of the mask inner frame 30 carries the boss 292 past the bar 96, and release of tension on the cable portion 60 allows the frame 30 to counter-rotate and brings the boss 292 into contact with the other side of the bar 96 so that the frame 30 is locked in position with the clear element 33a in alignment with the viewing opening 22.

At the same time, one of a pair of projecting arms 120a, 120b extending from the peripheral edge of the frame 30 adjacent the elements 34a, 34b, contacts a member 122a extending from the movable shielding glass 24. The glass 24 is mounted in the frame 26 supported on an offset arm 128 pivotally mounted for free swinging movement on a bracket 130 extending from the hood portion 14. The frame 26 is positioned relative to the hood portion 14 so as to slidably fit into and out of a slotted outer frame 132 which extends from the front of the hood to surround the viewing opening 22. With this arrangement, as the frame 30 is rotated to bring the clear element 33a or 33b in position, the glass 24 is swung out of the frame 132 to the position shown in dotted lines in Figure 1 giving a clear unobstructed view to the welder.

When it is desired to return the element 34a to working position, a further pull on the cable portion 60 causes the frame 30 to rotate to the position where the boss 293 contacts the bar 96 and flexes the member 294 between the stop bosses 212, 214. Due to the relative position of the bosses with respect to the peripheral edge of the frame 30, the boss 293 does not pass beyond the bar 96. On the release of the cable 60, the counter-rotation of the frame 30 brings the boss 292 downwards towards the bar 96, but due to the angular displacement of the bar by the boss 293, the boss 292 clears the outer end of the bar 96 allowing the frame 30 to rotate to the position where the element 34a is again in alignment with the viewing opening. The continued reverse rotation of the frame 30 brings the boss 290 again into contact with the bar 96 so that the member 294 is flipped over the stop boss 212 into the the original position and by the stop member 218 the bar 96 is retained in this position, locking the frame 30 against further rotation. At the same time, the return movement of the arm 120a returns the glass 24 to its original position masking the outer portion of the viewing opening 22.

As will be appreciated, the boss arrangement is duplicated on the other half of the frame 30 so that when the elements 34b, 33b are used, bosses 290b, 292b and 293b co-operate with the flexible member 294, and the pivotally mounted bar 96 as described.

The cable end 60 is unhooked from the hook 62a and the inner frame 30 rotated by hand until the element 34b is in the masking position. At this point, the boss 290b has placed the member 294 against the stop boss 212. The cable end 60 is hooked on to the hook 62b and the action is the same.

While it will be appreciated that the necessary tension to the cable portion 60 through the connecting means by the cable portion 100 can be accomplished by any suitable lever or handle disposed within easy access of the welder, in the preferred construction illustrated, this is accomplished by the following arrangement: an electrode holder 140 is provided with a special bracket 142 to which there is pivotally mounted a lever 144 having a bifurcate extension 146 connected to the end of the cable portion 100.

The tubular sheath 102 of the cable 100 is connected directly to an extension 143 of the bracket 142 so that as tension is applied to the cable portion 100, it is free to slidably move outwardly of the end of the sheath 102.

In order that the lever 144 may be locked in a position corresponding to the position of the hood inner frame locking means, a shaft 150 having a square end 152 is mounted for rotation in the bracket 142 transversely to the pivotal swing of the lever extension 146. The end of the shaft 150 remote from the square end 152, is provided with an extension 154 and the lever extension 146 is provided with upper 156 and lower 158, extensions which are adapted to contact the shaft extension 154 during the pivotal movement of the lever extension. The other arm of the lever extension 146 is provided with a forked projection 160 with the arms of the extension being spaced apart to correspond with the square section of the shaft end 152.

With this arrangement, when the lever arm 144 is depressed, in order to pull the cable 100 and rotate the frame 30 to the first position, the forked projection 160 clears the shaft end 152.

On depressing the lever 144 further, as is necessary to achieve the second position of the frame 30 where the elements are changed, the lower lever extension portion 158 contacts the shaft extension 154 and rotates the shaft 150 to a position where the end 152 is rotated from the square. Thus, when the lever 144 is released, the fork projection 160 can not pass the shaft end 152 and the cable 100 is locked in this position. When it is desired to return the elements to their original position, further pressure on the lever 144 to the maximum point again brings the lower extension 156 into contact with the shaft extension 154 and rotates the shaft end 152 again into square position where it allows the fork projection 160 to pass. Release of the lever 144 causes the cable 100 to return to its original position as controlled by the stop arrangement within the hood. The upper extension 156 of the lever arm extension contacts the shaft extension 154 returning it to its original position.

As a means of indicating these positions to the operator, the portion of the bracket 142 journalling the shaft 150 is provided with radially spaced apart openings 170 which are engaged by a projecting boss 172 provided on the lever arm extension 146. Stops 174 are also provided on the bracket 142 to prevent the lever arm extension 146 from travelling beyond the desired limits.

A further feature is embodied in the electrode holder 140 in that provision is made for preventing the striking of an arc when the masking glass 24 and the tinted elements 34a or 34b are not in position to shield the welder's eyes. The holder 140 is provided with a central portion 180 of electro-conductive material surrounded by an outer portion 182 of insulating material. A recess 184 extends transversely into the holder 140 and a plunger 186 slidably fits in the recess 184 with a rod 188 extending through the portion 182 to a connection with the inner surface of the cable-actuating lever 144. A coil spring 190 is mounted over the rod 188 to resiliently act against the lever 144 so as to return it to extended position.

The standard electrical lead 192 to the electrode holder is secured in a fitting 194 which is inserted in the holder 144 to contact a contact plate 181. A spring type electrode clamp 196 having a fixed and a movable jaw is fitted in the electrode holder, with the inner end in contact with the electro-conductive portion 180. The fixed jaw 198 of the electrode clamp is provided with a series of grooves 199 of graduated size to accommodate several dimensions of electrodes. The movable jaw 200 is spring biased as indicated at 202 to hold the electrodes in place against the fixed jaw 198.

With this arrangement, when the lever 144 is depressed to actuate the element bearing frame 30 into rotative movement whereby the glare masking elements are moved away from the viewing window 22, the plunger 186 is extended so as to remove it from contact with the contact plate 181 and the portion 180 and accordingly breaks the circuit. Release of the lever 144 to bring the glare masking elements into operation position, causes the spring 190 to return the plunger 186 to contact with the plate 181 and the portion 180, completing the circuit so that the welding arc may be struck. Thus, it is impossible for the welder to strike an arc when the glare proof elements are not in eye shielding position.

I claim:

1. A welder's mask having a front portion including a viewing opening and protective top and side portions extending from said front portion, a supporting frame mounted for rotation within said mask about a spindle mounted on said top portion at an oblique angle relative to said front portion, a plurality of translucent vision masking elements mounted on said frame in equally spaced apart relationship, each of said elements being adapted to overlap said viewing opening in selective sequence upon rotation of said supporting frame, means between said mask top portion and said supporting frame adapted to retain said frame in selective position relative to said mask viewing opening, flexible actuating means connected to said supporting frame adapted to rotate said supporting frame in one direction, resilient means between said spindle and said supporting frame adapted to rotate said frame in a direction opposed to said flexible actuating means, and a manually operable means connected to said flexible actuating means adapted to exert tension on said flexible actuating means at a position remote from the said mask.

2. A welder's mask as claimed in claim 1 wherein said translucent elements are alternately tinted and transparent, providing glare proof and full vision masking screens respectively for said viewing opening.

3. A welder's mask as claimed in claim 1 wherein said elements supporting frame is circular in outline and dish-shaped in contour with said masking elements disposed adjacent the outer periphery.

4. A welder's mask as claimed in claim 1 including an additional transparent masking element mounted on the exterior of said mask front portion for pivotal movement into and out of said register with said viewing opening, and means on said supporting frame cooperating with said frame registering means adapted to cause said pivotal movement upon rotation of said supporting frame.

5. A welder's mask as claimed in claim 1 wherein said manually operable means comprises a lever having a bifurcate extension, said lever being pivotally mounted on a supporting bracket secured to an electrode holder, and cooperating stop members on said lever extension and bracket adapted to control the extent of movement of said flexible actuating means.

6. A welder's mask having a front portion including a viewing opening, a top portion and side portions extending from said front portion, a supporting frame mounted for rotation within said mask about a spindle extending from said mask top portion, a plurality of translucent vision masking elements mounted on said frame in equally spaced apart relationship each of said elements being adapted to overlap said viewing opening in selective sequence upon rotation of said supporting frame, stop means between said mask top portion and said supporting frame adapted to retain said frame in selective position relative to said mask viewing opening, flexible actuating means connected to said supporting frame adapted to rotate said frame in one direction, resilient means between said mask and frame adapted to rotate said frame in a direction opposed to said flexible actuating means, a further translucent masking element mounted on a supporting arm pivotally connected to the exterior of said mask in a position to normally support said element in register with said mask viewing opening, cooperating means in said element supporting frame and inner frame adapted to pivotally move said element into and out of register with said viewing opening on rotation of said frame, and manually operable lever means connected to said flexible actuating means at a position remote from said mask.

7. A welder's mask as claimed in claim 6 wherein said first named translucent elements are alternatively tinted and transparent providing glare proof and full vision masking screens respectively for said viewing opening, and said second translucent element is transparent.

8. A welder's mask as claimed in claim 6 wherein said element supporting frame is circular in outline and dish-shaped in contour with said first named masking elements disposed adjacent the outer periphery.

References Cited in the file of this patent

UNITED STATES PATENTS

| Number | Name | Date |
|---|---|---|
| 1,497,012 | Goodspeed | June 10, 1924 |
| 2,086,208 | Brekelbaum | June 6, 1937 |

FOREIGN PATENTS

| Number | Country | Date |
|---|---|---|
| 386,350 | Great Britain | Jan. 19, 1933 |